July 27, 1965
R. E. WOOD
3,196,629
REFRIGERATION HEAD PRESSURE CONTROL SYSTEMS
Filed June 1, 1964
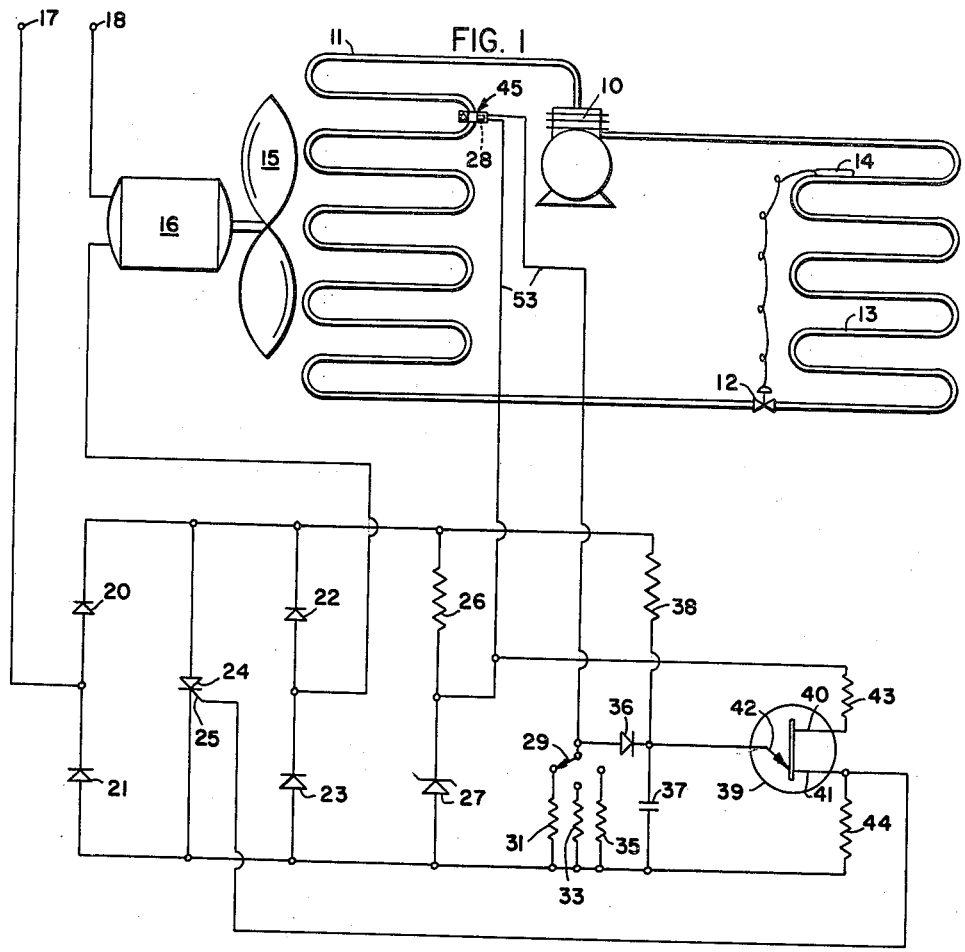
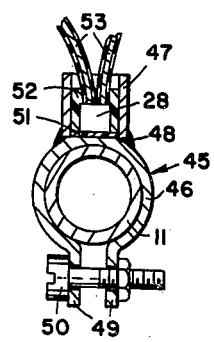
INVENTOR.
RUSSELL E. WOOD.
BY Frank N. Decker Jr.
ATTORNEY.

United States Patent Office 3,196,629
Patented July 27, 1965

3,196,629
REFRIGERATION HEAD PRESSURE CONTROL SYSTEMS
Russell E. Wood, Syracuse, N.Y., assignor to Carrier Corporation, Syracuse, N.Y., a corporation of Delaware
Filed June 1, 1964, Ser. No. 371,262
7 Claims. (Cl. 62—183)

This invention relates to refrigeration systems, and more particularly to maintaining a predetermined minimum head pressure in a refrigeration system of the type employing an air-cooled condenser.

The condenser of an air-cooled refrigeration system is normally located out of doors or in heat exchange relation with outdoor air and is therefore subject to a wide variety of ambient temperatures. It frequently occurs that during wintertime operation, when outdoor temperatures are low, the heat load, such as a computer installation, is substantially similar to the heat load during warmer weather and the refrigeration system is required to operate at nearly full capacity at all times. During wintertime operation, however, outdoor temperatures may drop sufficiently low to materially reduce the condensing temperature of refrigerant in the condenser. For example, a typical air-cooled refrigeration system might have a condensing temperature of 125° F. when employing R-22 as a refrigerant with an outdoor temperature of 95°. Under the same conditions at 0°, outdoor temperature, such as may be experienced in the wintertime, the condensing temperature may drop to 30° F.

The reduction in condensing temperature with an outdoor temperature produces a corresponding reduction in head pressure on the high pressure side of the refrigeration system. This reduction in head pressure results in a lessened pressure difference across the thermal expansion valve or other refrigerant metering device in the refrigeration system. Consequently, because of the reduced pressure difference across the refrigerant metering device, less refrigerant is passed to the evaporator and the capacity of the refrigeration system is reduced. As explained above, it will be appreciated that it is desirable to provide some means to prevent a reduction in the capacity of the refrigeration system under conditions of low ambient temperatures. Furthermore, in some instances "starving" of the evaporator, which results from the reduction in head pressure at low ambient condenser temperatures, may cause the evaporator coil to operate at a temperature below freezing and cause condensed moisture to freeze on the evaporator coil. The layer of ice, which builds up on the evaporator coil, insulates the coil from the refrigeration load and causes a further reduction in system capacity.

It has been previously proposed to vary the current through the electric motor driving the condenser fan by employing a thermistor in series with the motor winding in order to maintain the desired minimum condensing temperature. Prior attempts to achieve this result have proved unsatisfactory for the control of moderate and large size refrigeration systems because the size fan motors required for a large system draw a high current and the thermistor tended to self-heat causing erratic and unreliable "runaway" operation of the refrigeration system. Consequently, such systems were necessarily of small capacity and this solution was unsatisfactory for moderate or large size systems.

It is accordingly an object of this invention to provide an improved refrigeration system.

It is a further object of this invention to provide improved control of head pressure and condensing temperature in a refrigeration system.

These and other objects of this invention are achieved in the illustrated, preferred embodiment thereof by providing a refrigeration system having an air-cooled condenser with a fan driven by an electric fan motor for passing air over the condenser. The motor is preferably of the alternating current type having a full wave rectifier bridge circuit in series with, and blocking the flow of current from a source of alternating current to the fan motor. A solid state switch, comprising a silicon controlled rectifier, is provided in parallel with the bridge circuit to control the duration of passage of alternating current to the fan motor. A temperature senstive resistance element, such as a thermistor having a negative temperature coefficient of resistance, is secured to the refrigerant condenser in heat exchange relation therewith and is employed in a circuit to provide a bias voltage on the emitter of a unijunction transistor. Means are provided in the bias circuit to provide a selectable minimum head pressure or condensing temperature. Pulsating direct current from the full wave rectifier bridge circuit, having a voltage which is a function of time, is also applied to the emitter of the unijunction transistor. As the voltage builds up as a function of time on the emitter of the transistor, a point in time is reached when the voltage is sufficiently large to cause the transistor to conduct current. The current output of the unijunction transistor is applied to the gate of the silicon controlled rectifier, which in turn controls the effective magnitude of the power supplied to the fan motor.

The temperature of the condenser determines the resistance of the temperature sensitive resistance element, which in turn controls the bias voltage on the transistor and the length of time required for the buildup of sufficient voltage on its emitter before triggering of the controlled rectifier. The controlled rectifier is arranged in the bridge circuit so that it becomes nonconducting twice during each cycle of alternating current impressed on the bridge circuit and must be retriggered to again conduct current to the condenser fan motor. Consequently, the circuit described controls the duration of current flow each half-cycle through the fan motor and thereby controls the fan speed and the quantity of air which is passed over the refrigerant condenser.

If the condensing temperature drops below a selected predetermined temperature, the resistance of the temperature sensitive element increases causing the bias voltage to decrease and the controlled rectifier to be triggered for a shorter period of time each half-cycle, which in turn decreases the effective power supplied to the fan motor. The decreased power supplied to the fan motor causes the fan speed to decrease and causes less air to pass over the refrigerant condenser. The reduced quantity of air passing over the refrigerant condenser results in the condensing temperature rising to the predetermined desired minimum condensing temperature. Means may be provided for selecting or adjusting a desired condensing temperature, if desired.

The circuit described possesses the advantage of requiring relatively little current flow through the temperature sensitive resistance element so that self-heating of the resistance element does not result in a spurious operation of the head pressure control circuit.

These and other objects of this invention will become more readily apparent by reference to the following description and attached drawings wherein:

FIGURE 1 is a schematic view of a refrigeration system embodying a head pressure control in accordance with this invention; and FIGURE 2 is a framentary view, partly in cross section, showing the means for attaching a temperature sensitive resistance element to a refrigerant condenser in accordance with this invention.

Referring to FIGURE 1 there is shown a refrigeration system which comprises a compressor 10, an air-cooled condenser 11, a thermal expansion valve 12 and a refrigerant evaporator 13. Thermal expansion valve 12 is controlled by a temperature bulb 14 connected to the outlet of evaporator 13 and controls refrigerant flow through the system in a manner as is well known. Other refrigerant metering devices, such as a capillary tube, may be employed instead of a thermal expansion valve, if desired. A fan 15 driven by an alternating current motor 16 is positioned to pass ambient or outdoor air over condenser 11 to condense refrigerant therein.

Fan motor 16 is preferably of the alternating current type although it will be apparent that by suitable relocation of the motor in series with the controlled rectifier in the bridge circuit, a direct current motor may be employed instead. It has been found desirable to employ a motor having a relatively high impedance rotor in order to obtain satisfactory operation of the system described. A high rotor impedance also provides a relatively flat speed torque curve to improve stability of operation of the system and reduces the heating of the rotor due to rotor current caused by the harmonics present in the power supplied to the motor by the control circuit and due to rotor slip. Furthermore, the change in motor speed with the changes in condensing temperature is found to be more linear when using a high impedance rotor.

Fan motor 16 is connected to a source of alternating current such as line terminals 17 and 18 through a full wave alternating current bridge rectifier circuit. The bridge circuit comprises diodes 20 and 21 in parallel with the diodes 22 and 23 as shown in the drawing. It will be seen that the bridge circuit is effectively in series between motor 16 and terminals 17 and 18, terminal 17 being connected between diodes 20 and 21 and terminal 18 being connected through motor 16 to diodes 22 and 23. The bridge circuit, having the diodes oriented as shown in the drawing, blocks the flow of current to the fan motor.

A solid state switch such as silicon controlled rectifier 24, having a gate 25, is connected in parallel with the bridge circuit. When controlled rectifier 24 is triggered to a conducting state by impressing a positive pulse on gate 25, current is enabled to flow from terminal 17 through diode 20, controlled rectifier 24, diode 23 through motor 16 to terminal 18. During the opposite half-cycle current flows from terminal 18 through motor 16, diode 22, controlled rectifier 24 and diode 21 to terminal 17. As will be understood, controlled rectifier 24 begins to conduct only when a positive voltage is impressed on both its anode and gate and continues to conduct until the positive voltage is removed from its anode. Since rectified direct current output from the bridge circuit is constantly impressed as a periodic, unidirectional voltage between the anode and cathode of the controlled rectifier, the controlled rectifier is turned off at least twice during each cycle of alternating current, when the D.C. voltage on its anode reaches zero. Accordingly, the effective magnitude of the power supplied to motor 16 is determined by the length of the time during which controlled rectifier 24 is in a conducting state during each half-cycle, which in turn can be controlled by the time during each half-cycle that a positive pulse is first impressed on gate 25.

A voltage divider comprising a resistor 26 in series with a Zener diode 27 is also connected in parallel with the D.C. output of the diode bridge circuit. The Zener diode is selected to provide a constant reference voltage across its terminals when controlled rectifier 24 is in a nonconducting state.

A temperature sensitive resistance element 28, having a negative temperature coefficient of resistance, commonly called a thermistor, is secured to condenser 11 in heat exchange relation therewith at a suitable location to sense the saturated condensing temperature of the condenser. Resistance element 28 has a resistance which is therefore an inverse function of the condensing temperature and the head pressure in the refrigeration system. Resistance element 28 is connected by switch 29 in series with one of resistors 31, 33, 35, depending on the terminal to which the switch is connected. The series combination of resistance element 28 and the resistor to which switch 29 is connected is disposed in parallel across the constant voltage between the terminals of Zener diode 27. The voltage drop across thermistor 28 is an inverse function of the condensing temperature or head pressure of the refrigeration system. Therefore, the resistor 31, 33, or 35, which is in series with resistance element 28, has a voltage drop across it which is a direct function of the condensing temperature or head pressure in the refrigeration system. The voltage across the resistor to which switch 29 is connected is impressed on emitter 42 of a unijunction transistor 39, through an isolating diode 36. A charging capacitor 37 is connected, as shown in the drawing, between emitter 42 and the lower terminals of resistors 31, 33 and 35.

Unijunction transistor 39 comprises base terminal 40 and base terminal 41 in addition to emitter 42. Resistor 44 is connected to base terminal 41 and to the lower terminal of capacitor 37. Resistor 43 is connected in series between base terminal 40 and the connection between resistor 26 and Zener diode 27. A resistor 38 is connected between emitter 42 and the upper terminal of resistor 26 to provide a periodically pulsating unidirectional voltage output of the bridge rectifier circuit on the emitter of the transistor.

It will be seen that two voltages are impressed on emitter 42 and charging capacitor 37 between the emitter base 41. The first voltage is the voltage appearing across the resistor selected by switch 29 and is a direct function of the actual condensing temperature or head pressure of the refrigeration system. The second voltage is periodically pulsating D.C. output of the diode bridge circuit having a magnitude which is a function of time. The level of the bias voltage provided by the resistor selected by switch 29 is selected so as to be insufficient to trigger unijunction transistor 39 to a conducting state. However, the circuit component values are selected so that the addition of the periodic D.C. voltage through resistor 38 will, at some period of time during the pulse cycle, build up to a magnitude sufficient to break down the transistor and cause it to conduct current. When the unijunction transistor is triggered to a conducting state, capacitor 37 discharges through the transistor, providing a current which is conducted through a conductor extending between base 41 and gate 25 of controlled recifier 24, which in turn triggers the silicon controlled rectifier to a conducting state. As previously explained, when controlled rectifier 24 is in a conducting state, current is passed through motor 16 to operate fan 15.

The effective magnitude of the power supplied to motor 16 is thus determined by the condensing temperature or head pressure of the refrigeration system. This is achieved by varying the bias on emitter 42 due to the variable resistance of temperature sensitive resistance element 28. As the condensing temperature or head pressure of the refrigeration system decreases below the desired minimum value, the bias voltage on emitter 42 decreases due to an increase in the resistance of resistance element 28, and unijunction transistor 39 is triggered to a conducting state for a later time during each half-cycle of application D.C. voltage through resistor 38. In other words, the periodic D.C. voltage applied to emitter 42 through resistor 38 is a direct function of time and the lower the bias voltage on the emitter, due to the condition of resistance element 28, the longer will be the length of time required to build up sufficient voltage to cause the transistor to breakdown and conduct current from emitter 42 to base 41. Consequently, controlled rectifier 24 will conduct for a shorter period of time during each cycle when the resistance or resistance element 28 is relatively high, and vice versa. Thus transistor 39 and controlled rectifier 24 comprise a switch means to control the power supplied to fan motor 16.

The resistances of resistors 31, 33, 35 are selected so as to correspond with different desired head pressures or condensing temperatures. The operator of the refrigeration system selects the desired head pressure or condensing temperature with switch 29 and thereafter the speed of fan 15 is automatically controlled to obtain the desired condensing temperature or head pressure.

FIGURE 2 shows the clamp arrangement in cross section which is preferred for attaching temperature sensitive resistance element 28 to condenser coil 11. Clamp 45 comprises a good heat conducting metal saddle portion 46 and a tubular upright portion 47 soldered to saddle 46 at 48. Saddle 46 conforms with the shape of the condenser tube and is provided with outwardly flared projections 49, which are clamped by suitable fastening means 50, such as a nut and bolt around the exterior of a suitable tube of coil 11 in secure mechanical contact and good heat transfer relation therewith. A thin, heat conducting, electrically insulating, disc 51 of Mylar, or the like, is disposed adjacent the lower end of tubular portion 47 overlying saddle 46. Temperature sensitive resistance element 28 is positioned with one face in contact with relatively thin insulating disc 51 and the resistance element is encapsulated in upright portion 47 by surrounding the remaining sides in an epoxy resin 52. Suitable electrical leads 53 extend from the temperature sensitive resistance element out of the clamp member for connection to the electrical circuit previously described.

The preferred clamp member is advantageous because it permits location of the temperature sensitive resistance element at any desired place on the condenser coil to obtain optimum sensitivity to the desired function of head pressure or condensing temperature. In addition, it makes the head pressure control system described suitable for use with pre-existing installations and permits field application of the head pressure control when desired without physical modification of the refrigeration system. This clamp also provides considerable flexibility in the positioning of the element on the condensing coil so that it may be located in a region corresponding with the saturated condensing temperature.

It will be observed that a major advantage of the refrigeration system described lies in the fact that the current which flows through resistance element 28 may be extremely small, such as about 2 milliamperes. Consequently, the resistance element is not self-heated to a significant extent, even in systems requiring relatively large electric motors for driving the condenser fan because no motor current flows through the temperature sensor. From the standpoint of safety, the arrangement described offers the advantage that motor current does not flow through the temperature sensor and the voltage drop across the temperature sensor may be selected at some low value which does not endanger the operator in the event of malfunction. The system is also completely automatic in operation, and lends itself to reliable manufacture due to its entirely solid state circuit.

While the invention has been described with reference to a preferred embodiment thereof, it will be appreciated that it may be otherwise embodied within the scope of the following claims.

I claim:

1. A refrigeration system comprising a compressor, a condenser, an evaporator, and a refrigerant metering device connected to provide refrigeration; a fan arranged for passing air over said condenser to condense refrigerant therein; a fan motor arranged to drive said fan, switch means arranged to control the passage of current through said fan motor, said switch including actuating means to actuate said switch to a conducting state; temperature responsive means disposed in heat exchange relation with said condenser; means providing to said actuating means a control signal which is a function of time and sensed temperature to periodically actuate said switch to a conducting state; and means to periodically actuate said switch to a non-conducting state, so as to limit the effective power supplied to said motor to a value which results in a fan speed which provides at least a predetermined desired minimum condenser temperature.

2. A refrigeration system comprising a compressor, an evaporator, a refrigerant condenser, and a refrigerant metering device connected to provide refrigeration; a fan arranged to pass air over said condenser to condense refrigerant therein; an electric motor arranged to drive said fan, said motor being connected to a source of alternating current energy; and means to adjust said fan speed to adjust the condensing temperature of said system comprising switch means arranged to control the effective power supplied to said fan motor from said alternating current source, said switch being sufficiently fast in operation to permit control of the duration of current from said alternating current energy source to said fan motor during each cycle of alternating current, a temperature sensor disposed in heat exchange relation with said condenser; and circuit means to automatically control the duration of the passage of power during each cycle of alternating current to said fan motor in accordance with the temperature sensed by said temperature sensor to limit the effective power supplied to said motor in a manner so as to limit the fan speed to a speed which provides at least a predetermined desired minimum condensing temperature by limiting the quantity of air passed over said refrigerant condenser by said fan.

3. A refrigeration system comprising a compressor, a condenser, an evaporator and a refrigerant metering device connected to provide refrigeration; a fan arranged for passing air over said condenser to condense refrigerant therein; a fan motor arranged to drive said fan, switch means arranged to control the passage of current through said fan motor, said switch including actuating means to trigger said switch to a conducting state; temperature responsive means disposed in heat exchange relation with said condenser; a transistor having an emitter; means providing a voltage which is a sum of a function of said sensed temperature and a function of time on said emitter of said transistor; conductor means to conduct a current output from said transistor to actuate said switch means to a conducting state from a signal output of said transistor; and means to render said switch means periodically non-conducting, so as to limit the effective power supplied to said fan motor to an amount which results in a fan speed which provides at least a predetermined desired minimum condensing temperature.

4. A refrigeration system comprising a compressor, a refrigerant condenser, an evaporator, and a refrigerant metering device connected to provide refrigeration; a condenser fan arranged to pass air over said refrigerant condenser to condense refrigerant therein; a fan motor arranged to drive said fan; and a control circuit for controlling the speed of said fan, said circuit including a temperature sensor secured to said refrigerant condenser in heat exchange relation therewith, switch means arranged to control the passage of power to said fan motor, means to provide a bias voltage which is a function of the sensed temperature and having a magnitude which is insufficient to trigger said switch to a conducting state, means to add a periodic voltage which is a function of time to said bias voltage to trigger said switch means to a conducting state, and means to periodically render said switch nonconducting so as to limit the effective power supplied to said fan motor to an amount which will limit the fan speed and the corresponding quantity of air passed over said condenser to an amount which will provide at least a predetermined minimum condensing temperature.

5. A refrigeration system as defined in claim 4 wherein said temperature sensitive resistance element is secured to said condenser by a clamp comprising a tubular portion secured to a heat conducting metal saddle portion, said saddle portion being disposed about a refrigerant carrying tube, clamping means to hold said saddle portion in tight mechanical engagement and in good heat transfer relation with said tube, and said temperature sensitive resistance element being disposed within said tubular portion of said clamp in heat transfer relation with said saddle portion.

6. A refrigeration system comprising a compressor, an evaporator, a refrigerant metering device and an air-cooled condenser connected to provide refrigeration, said air-cooled condenser being exposed to varying ambient conditions; a fan for passing air over said condenser; an electric motor, having a relatively high impedance rotor, connected to drive said fan; a full wave diode bridge circuit connected in series with and blocking the passage of current from an alternating current line to said fan motor; a controlled rectifier having a gate operatively connected in parallel with said bridge circuit to control the duration of the passage of current on each cycle through said fan motor, a unijunction transistor having an emitter connected to the gate of said controlled rectifier switch to trigger said switch to a conducting state; a temperature sensitive resistance element secured to said condenser in heat exchange relation therewith, selectively adjustable resistance means in series with said temperature sensitive resistance element to select a desired minimum condensing temperature, said temperature sensitive resistance element and said adjustable resistance means providing a bias voltage on the emitter of said unijunction transistor; and means to add a periodic voltage having a magnitude which is a function of time to said bias voltage to trigger said transistor to a conducting state thereby triggering said controlled rectifier to pass current from said alternating current line through said diode bridge circuit to said fan motor during a portion of each half-cycle of alternating current, the duration of the passage of said current being controlled by said temperature sensitive resistance element so as to provide an effective current through said fan motor to provide at least the selected condensing temperature in said refrigeration system.

7. A clamp for securing a temperature sensitive resistance element in secure mechanical engagement and heat transfer relation with a refrigerant carrying tube in a refrigeration system comprising a heat conducting metal saddle portion adapted to conform with the exterior shape of the refrigerant carrying tube to which said temperature sensitive resistance element is to be secured, said saddle portion including a pair of outwardly extending portions for engagement with fastening means to secure said clamp to said tube; and a tubular portion secured to said saddle portion; a relatively thin electrical insulator disposed within said tubular portion adjacent to, and overlying, said saddle portion; said temperature sensitive resistance element being disposed within said tubular portion having one side thereof in contact with said electrical insulator; and additional electrical insulation means within said tubular portion surrounding the remaining side of said resistance element.

References Cited by the Examiner

UNITED STATES PATENTS

| | | | |
|---|---|---|---|
| 1,695,295 | 12/28 | Rollins | 338—31 |
| 1,779,116 | 10/30 | Davenport | 62—184 |
| 1,909,870 | 5/33 | Rosino | 237—8 |
| 2,705,404 | 4/55 | Malutich | 62—184 |
| 2,952,991 | 9/60 | St. Pierre | 62—181 |

WILLIAM J. WYE, *Primary Examiner.*

Notice of Adverse Decision in Interference

In Interference No. 95,474 involving Patent No. 3,196,629, R. E. Wood, REFRIGERATION HEAD PRESSURE CONTROL SYSTEMS, final judgment adverse to the patentee was rendered Dec. 19, 1968, as to claims 1, 2, 3 and 4.

[*Official Gazette May 6, 1969.*]

Disclaimer 3,196,629.—*Russell E. Wood*, Syracuse, N.Y. REFRIGERATION HEAD PRESSURE CONTROL SYSTEMS. Patent dated July 27, 1965. Disclaimer filed Jan. 26, 1970, by the assignee, *Carrier Corporation*.

Hereby enters this disclaimer to claims 1, 2, 3 and 4 of said patent.

[*Official Gazette April 14, 1970.*]